(12) United States Patent
Thompson, III

(10) Patent No.: US 7,397,350 B2
(45) Date of Patent: Jul. 8, 2008

(54) SCHOOL BUS TRAFFIC CONTROL SYSTEM

(76) Inventor: William H. Thompson, III, 214 N. Wanamaker St., Philadelphia, PA (US) 19139

( * ) Notice: Subject to any disclaimer, the term of this patent is extended or adjusted under 35 U.S.C. 154(b) by 166 days.

(21) Appl. No.: 11/372,704

(22) Filed: Mar. 10, 2006

(65) Prior Publication Data
US 2006/0220807 A1     Oct. 5, 2006

Related U.S. Application Data

(60) Provisional application No. 60/661,941, filed on Mar. 16, 2005.

(51) Int. Cl.
*B60Q 1/26* (2006.01)
(52) U.S. Cl. ..................... 340/433; 340/425.5
(58) Field of Classification Search ................. 340/433
See application file for complete search history.

(56) References Cited

U.S. PATENT DOCUMENTS

| | | | | |
|---|---|---|---|---|
| 3,873,968 A | * | 3/1975 | Baader | .................. 340/433 |
| 4,368,349 A | * | 1/1983 | Donley et al. | ................ 174/535 |
| 5,604,480 A | * | 2/1997 | Lamparter | .................. 362/478 |
| 6,396,395 B1 | * | 5/2002 | Zielinski et al. | .......... 340/425.5 |
| 2003/0016143 A1 | * | 1/2003 | Ghazarian | .................. 340/901 |

OTHER PUBLICATIONS

Web Page, The Open Road—Classic Car Hire—Driving in the UK (Internet Archive citation, Oct. 15, 2004, http://www.theopenroad.co.uk/static_59.htm).*

* cited by examiner

*Primary Examiner*—Jeff Hofsass
*Assistant Examiner*—Kerri L McNally
(74) *Attorney, Agent, or Firm*—Paul B. Milcetic

(57) ABSTRACT

The invention is a versatile school bus traffic control system. When power is first applied, or the RESET pushbutton is pushed, it is set to its quiescent state. Pushing the MODE ADVANCE pushbutton switch will advance to the next state: flashing alternating yellow traffic control lights. The next push of MODE ADVANCE will advance the system to: flash traffic control lights, one side red and the other side yellow, next, the complementing red and yellow. This is repeated for approximately three seconds, next, automatically advancing to only alternating red traffic control lights flash, until MODE ADVANCE is again pushed. The invention then returns to quiescence. Optionally, the invention will reset, and or not respond to MODE ADVANCE if the school bus is in motion.

6 Claims, 9 Drawing Sheets

SCHOOL BUS TRAFFIC CONTROL SYSTEM

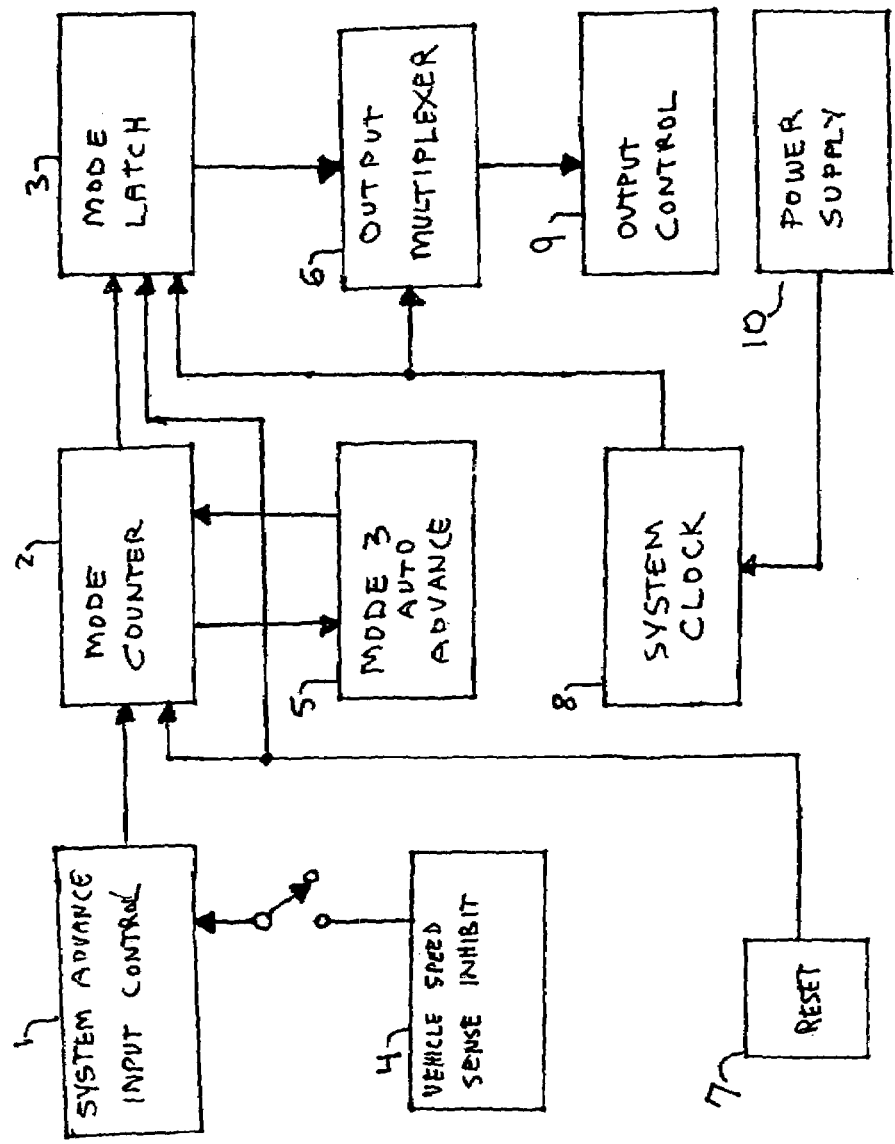

SYSTEM ADVANCE INPUT CONTROL

MODE 3 AUTO ADVANCE

OUTPUT MULTIPLEXER

SYSTEM CLOCK

Reset

SCHOOL BUS TRAFFIC CONTROL SYSTEM

CROSS REFERENCE TO RELATED APPLICATIONS

This application claims the benefit of U.S. Provisional Application Ser. No. 60/661,941 filed Mar. 16, 2005, which is incorporated herein by reference in its entirety.

FIELD OF THE INVENTION

This invention is generally related to the field of traffic signaling for improved road safety and, more particularly, to a method for the signaling oncoming traffic by a school bus.

BACKGROUND OF THE INVENTION

The history of the yellow school bus is steeped in Americana. That vehicle performs a very important job, carrying many of America's school students many places. Safety is paramount, hence, the color "School Bus Yellow" was designated by the Congress of the United States of America to be the official color of the school bus. Additionally, a school bus has the authority to control traffic in order to offer protection for students leaving the vehicle.

Typically, the bus operator initiates a signaling protocol using lights mounted on the school bus. Red and yellow traffic control lights are paired high up, front and rear, both left and right to provide maximum visibility. In particular, to caution a motorist to stop, alternating yellow lights flash for a period of time. Next, after the expiration of that period of time, alternating red lights flash commanding: "STOP, DO NOT PASS THE SCHOOL BUS!"

Unfortunately, this light signaling protocol is not optimal. For example, often, from the perspective of a driver moving towards a bus that has initiated such a protocol, the change from a yellow cautionary signal to red stop command occurs abruptly. Such abrupt change increases the chance that the red stop signal will cause the motorist to stop short, possibly causing an accident.

Thus, there is a need for an improved signaling protocol—one that will enhance the safety of not only the motorist approaching a school bus, but also of the children that are leaving or are about to leave the bus.

SUMMARY OF THE INVENTION

The present invention satisfies this need. In particular, it is the object of the present invention to provide a protocol for a school bus operator to control vehicular traffic in a manner that will augment safety by enhancing the reaction of the motorist to the school bus operators intent. The advantage of the invention is to establish a fixed, clearly defined, interim period of time to react.

In one embodiment of the invention, the format of the lighting protocol is as follows: an interim set of signals is flashed that comprises flashing traffic control lights, one side red and the other side yellow, followed by the complementing red and yellow (that is the side that flashed red now flashes yellow, and the side that flashed yellow now flashes red). This interim signaling occurs after the flashing of yellow and before the red command to stop traffic control lights. The invention will reduce the potential of traffic accidents by allowing motorists to react to a school bus with flashing traffic control lights with confidence. Also, the nations oil consumption will be positively impacted.

In another embodiment of the invention, the school authority can alter the signaling protocol and, in particular, can configure the protocol to hold the system inactive if the school bus is in motion, so that a motorist will not see traffic control lights flashing on a school bus in motion. By allowing the school authority to suppress signaling while the school bus is in motion, even when the bus operator may issued a signal protocol command, the school authority has the opportunity to prevent the oncoming motorist from making unnecessary stops when an erroneous operator command might otherwise cause a vehicle accident.

Further advantages of the present invention are made apparent in the more detailed description below.

BRIEF DESCRIPTION OF THE DRAWINGS

FIG. 1 is a high level block diagram showing the circuitry of a school bus traffic control system in accordance with an embodiment of the present invention.

DETAILED DESCRIPTION OF ILLUSTRATIVE EMBODIMENTS

Turning now to FIG. 1, it shows a high level block diagram showing the circuitry of a school bus traffic control system in accordance with an embodiment of the present invention.

As shown in that figure, an embodiment of the invention provides an input to accept an active low input from a VEHICLE SPEED SENSOR DEVICE 4 to inhibit an input circuit advance of the MODE COUNTER 2, if the school bus is in motion.

Figure 2:
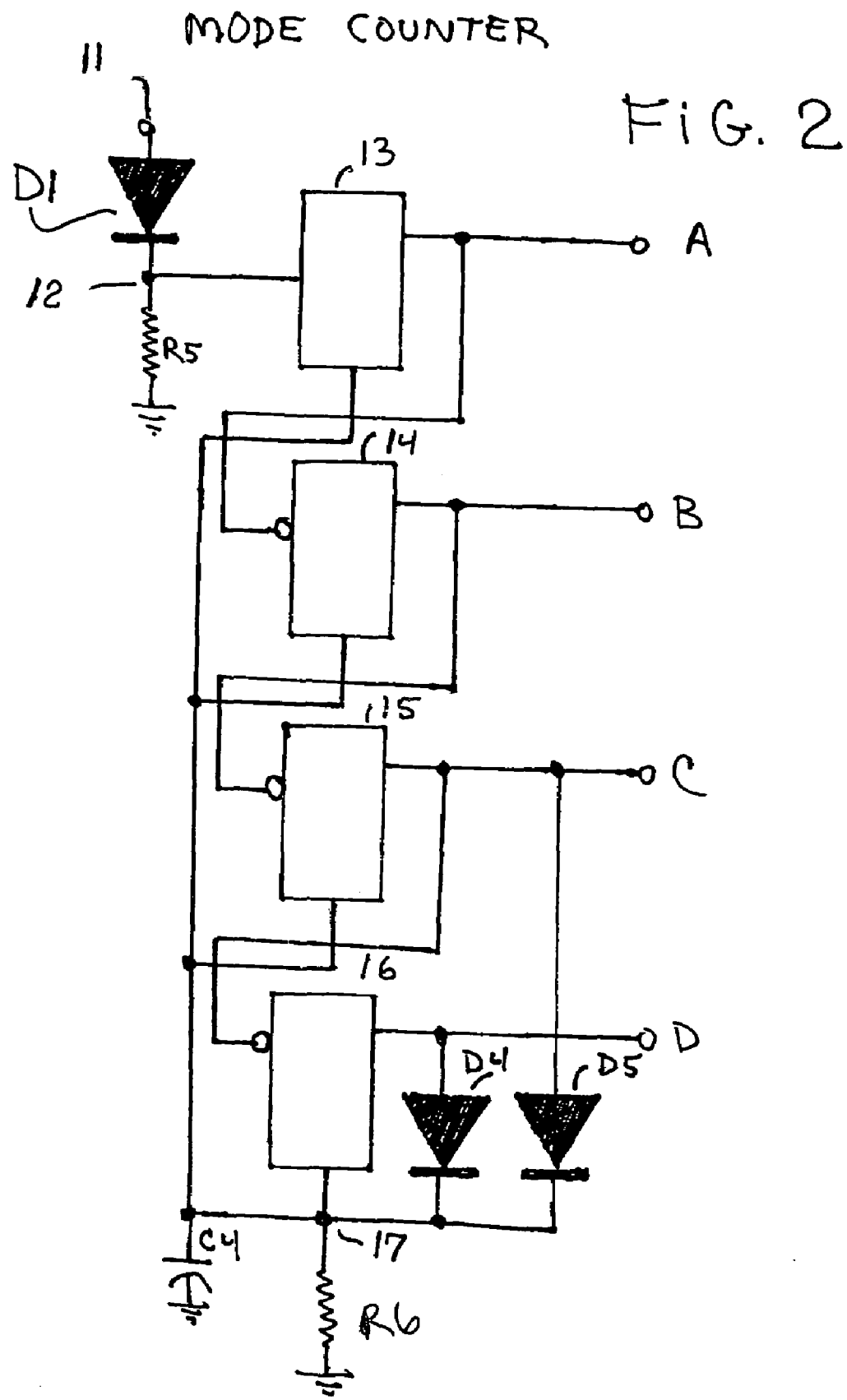
FIG. 2 is a diagram depicting the "Mode Counter" block shown in FIG. 1 in greater detail.

The input circuit advance 11 of the MODE COUNTER 2 is illustrated more clearly in FIG. 2. As shown in that figure, an embodiment of the invention provides an input to accept an active low input from a VEHICLE SPEED SENSOR DEVICE 4 to allow for inhibition of input circuit advance 11 of the MODE COUNTER 2, if the school bus is in motion. In this way, the school authority may suppress the signaling protocol.

During normal operation, by contrast, turning back to FIG. 1, the input advance circuit 11 of the MODE COUNTER 2 is activated when the SYSTEM ADVANCE INPUT CONTROL 1 is in a different state. Such activation of the input advance control circuit 11 is illustrated more clearly using FIG. 1A. In particular, the input advance circuit 11 of the MODE COUNTER 2 is activated when the trigger input of monostable circuit U1 of the SYSTEM ADVANCE INPUT CONTROL 1 is less than one third of Vcc supply voltage. This occurs when the mode advance, momentary closed switch, S1 is pushed, grounding C2, causing it to charge through R4. In turn, this grounding of C2 will generate a less than one third of Vcc pulse of approximately 10 ms. When triggered the output of U1 will pulse high 11, which will couple through isolation diode D1 to R5 12 to the clock input 13 (shown in FIG. 2) of MODE COUNTER 2. If S1 is held grounded, C2 will continue to charge towards Vcc through R4 causing the trigger voltage of monostable device U1 to become greater than one third of Vcc. When S1 is released, the voltage on C2 will discharge through R3. Until C2 discharges to less than one third of Vcc, pushing S1 will not retrigger U1. The purpose of R2, 3 and C2 circuitry is to minimize the possibility of erratic operation due to switch S1 contact bounce. Also, if S1 is held down continuously the invention will not cycle through its modes of operation.

Figure 1A:
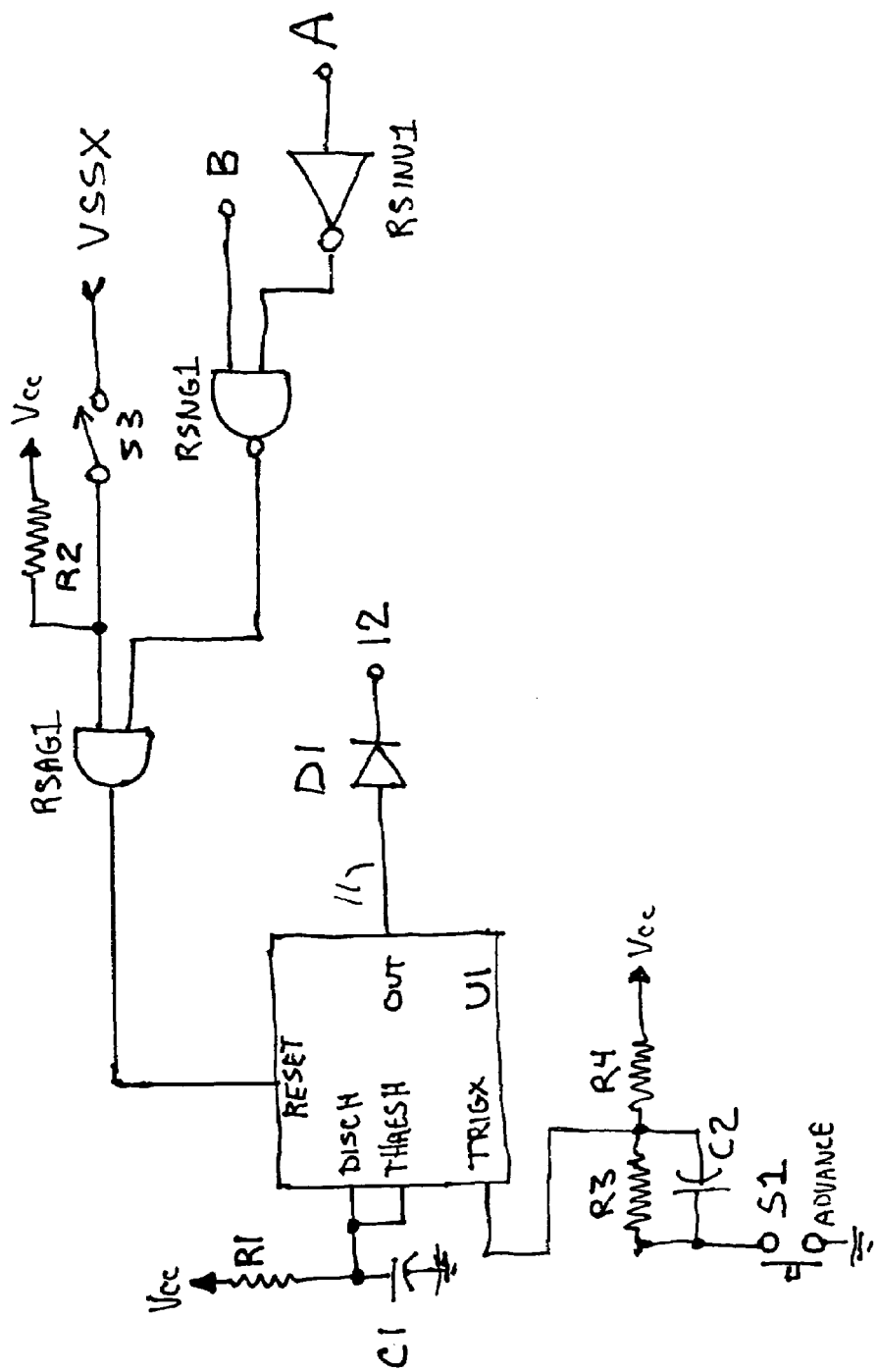
FIG. 1A is a schematic depicting the "System Advance Input Control" block shown in FIG. 1 in greater detail.

Turning to FIG. 2, again showing the MODE COUNTER 2 of FIG. 1 in greater detail, it illustrates how output A is connected to the input of inverter RSINV1 (in FIG. 1A). The output of said inverter is in turn connected to one input of NAND gate RSNG1 (in FIG. 1A). FIG. 2 further illustrates that output B is connected to the remaining input of NAND gate RSNG1 (in FIG. 1A). The output of NAND gate RSNG1 is, in turn connected to one input of AND gate RSAG1 (in FIG. 1A).

Turning back to FIG. 1A, it illustrates how the remaining input of said gate RSAG1 is connected to one end of R2, and serves to input through select switch S3, from another device a signal identified as: Vehicle Speed Sense Not, which is a logic low when the school bus is in motion. The other end of R2 is connected to Vcc. The output of AND gate RSAG1 is connected to the reset input of monostable device U1.

Turning back to FIG. 2, when the MODE COUNTER 2 output is A=0, B=1, as represents the state of mode 3, it translates through to the reset input of monostable device U1 as a logical low, holding said device quiescent if it were to receive a trigger during this time, as not to truncate the time period of mode 3. The MODE COUNTER 2 circuitry contains a 4 bit binary counter. The least significant bit is labeled A and is the output of COUNTER 13. The next higher bit is from COUNTER 14 and is labeled B. The next higher bit is labeled C from COUNTER 15 and the most significant bit is labeled D from COUNTER 16. In the presently described embodiment, the relevant or state of the MODE COUNTER 2 is as follows:

Mode 1, A=0, B=0: function: no traffic controls active.
Mode 2, A=1, B=0: function: flash alternating yellow traffic control lights only.
Mode 3, A=0, B=1: flash traffic control lights one side red and the other side yellow, next the complementing red and yellow traffic control lights, repeat.
Mode 4, A=1, B=1, function: flash alternating red traffic control lights only.

Continuing with the illustration in FIG. 2, the high order bits C and B, from COUNTER 15 and COUNTER 16 respectively are coupled through diodes D4 and D5 to develop a positive pulse across R6, and stretched by C6, to reset the mode counter, in the event of a high output from bit C or D, as is the case when only red traffic control lights flashing are extinguished by a pulse from SYSTEM ADVANCE INPUT CONTROL 1 (FIG. 1), which will advance MODE COUNTER 2 (FIG. 1) from state: A=1, B=1, C=0, D=0 to A=0, B=0, C=1. D=0.

Figure 3:
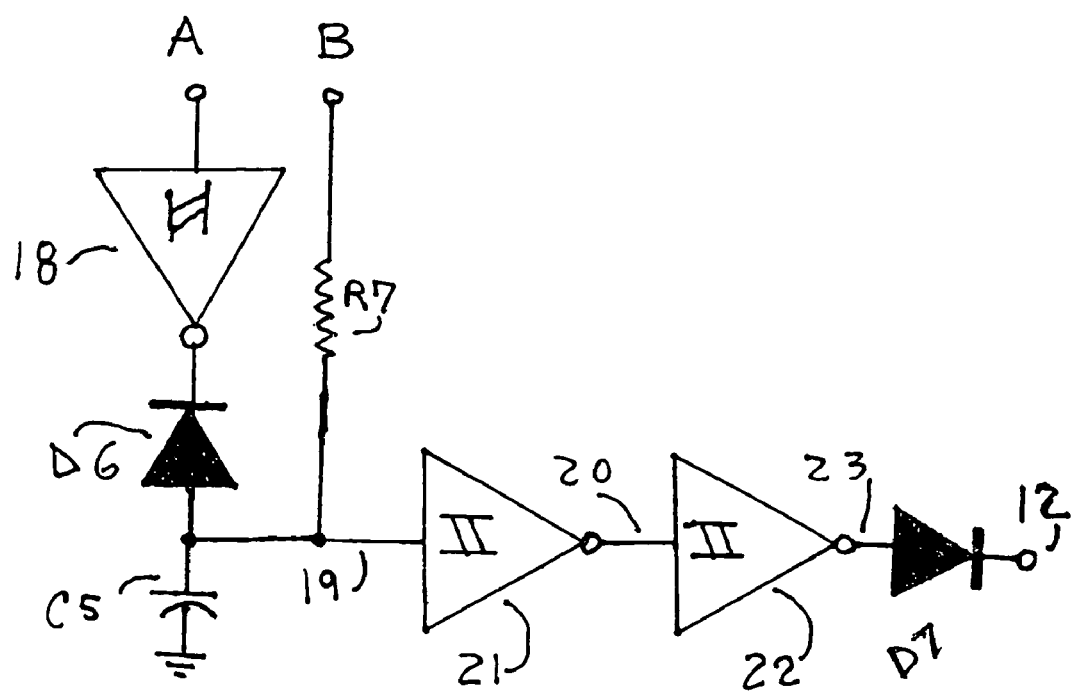
FIG. 3 is a schematic of the "Mode Auto Advance" block shown in FIG. 1 in greater detail.

Turning now to FIG. 3, it illustrates the MODE 3 AUTO ADVANCE 5 of FIG. 1 in greater detail. The MODE 3 AUTO ADVANCE 5 circuitry, will, as shown in FIG. 3, automatically advance mode counter MODE COUNTER 2 from state A=0, B=1 to A=1, B=1. More specifically, the MODE 3 AUTO ADVANCE CIRCUITRY function is as follows: A is connected to the input of inverter 18. The output of inverter 18 is connected to the cathode of diode D6 which is reversed biased. The high at B is connected to one end of R7. The anode of D6 junctions 19 with C5, R7 and the input of Schmitt inverter 21. The time to switch inverter 21 output 20 low, a function of C5 charging high through R7, is approximately 3 seconds. In this way the interim signaling state of the lighting protocol of the presently described embodiment lasts approximately 3 seconds.

Continuing with FIG. 3, the inverter 21 connects to the input of inverter 22 at junction 20. The output of inverter 22 junctions 23 with the anode of diode D7, to produce a high at said anode when the output of 21 goes low. The cathode of D7, junctions at 12 to provide a positive pulse to increment MODE COUNTER 2 (more specifically described in FIG. 2) to state: A=1, B=1. The output of inverter 18 is now low, discharging C5.

Figure 5:
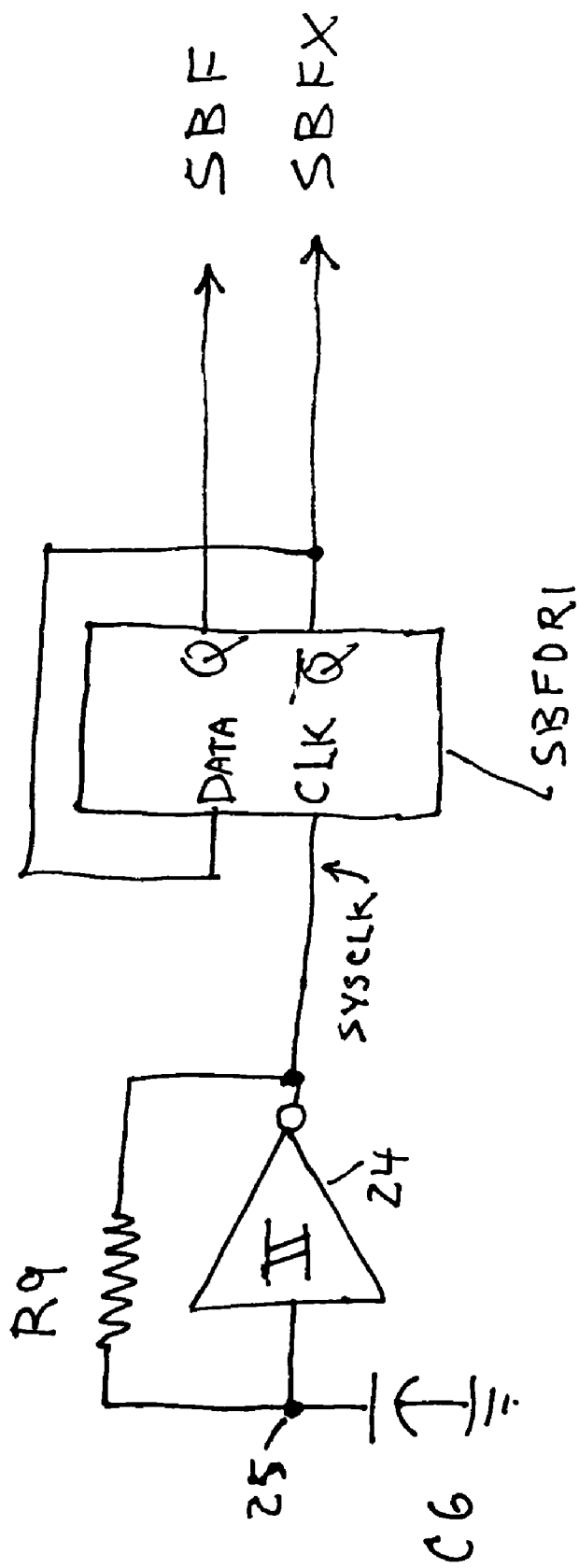
FIG. 5 is a circuit diagram of the "System Clock" block shown in FIG. 1 in greater detail.

Turning now to FIG. 5, it shows the SYSTEM CLOCK 8 of FIG. 1 in greater detail. The SYSTEM CLOCK 8 circuit generates a periodic square wave of approximately 1.66 hz. One end of capacitor C6 is grounded, and the remaining end junctions at junction 25, with one end of R9, on the hand, and the input of a Schmitt inverter 24, on the other. The remaining end of R9 connects to the output of inverter 24, labeled "sysclk." The charging and discharging of capacitor C6 through R9 about the hysteresis gap of inverter 24 causes said inverter to switch, and as it switches, the sysclk signal applies a signal exhibiting the characteristics of a square wave to the Data Register SBFDR1. The data input of that register is connected to the Q NOT (signal SBFX) output to provide the divide by two function. The Q output of said data register is Signal Bus Flash (SBF).

Figure 7:
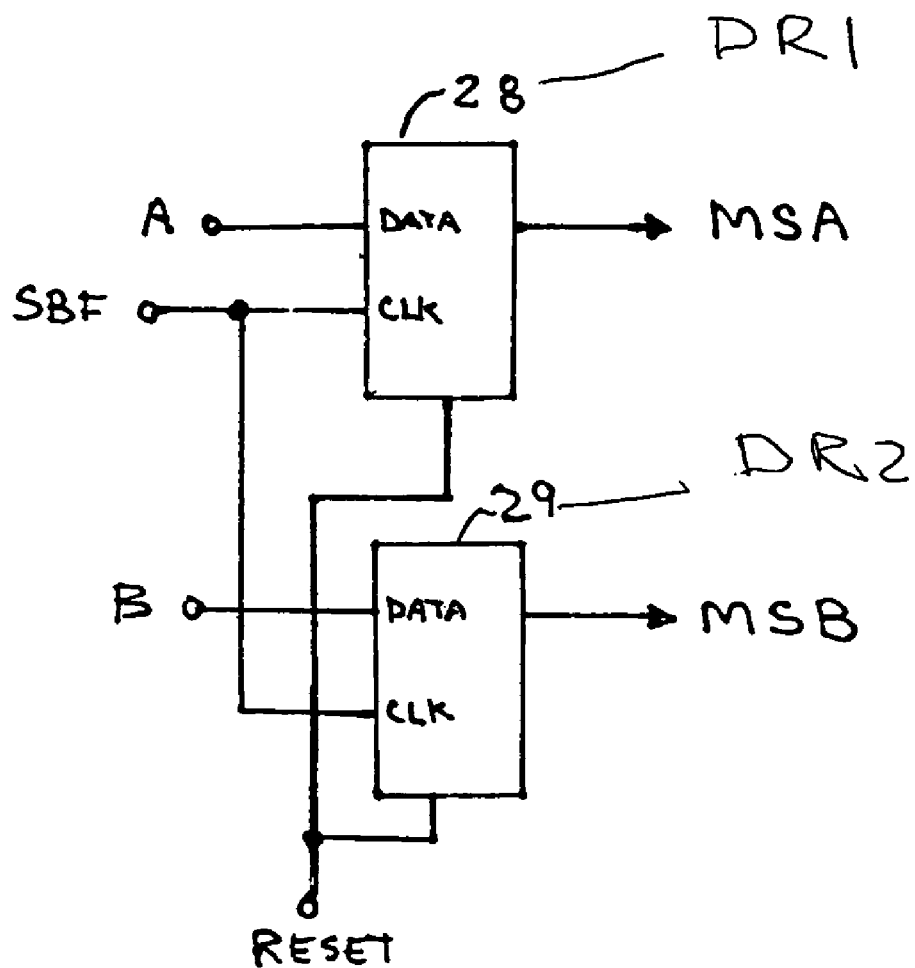
FIG. 7 is a diagram of the "Mode Latch" block shown in FIG. 1 in greater detail.

Turning now to FIG. 7, it shows the MODE LATCH 3 of FIG. 1 in greater detail. MODE LATCH 3 circuit is used to ensure that changes in school bus traffic control operation modes A and B are synchronized with signal School Bus Flash, which, in turn, is used to sequence changes in the school bus traffic control annunciators. MODE LATCH 3 circuitry consists of two data registers, MLDR1 and MLDR2. The data input of MLDR1 is connected to signal A from COUNTER 13 of MODE COUNTER 2 and data input to register MLDR2 is sourced from signal B from COUNTER 14 of MODE COUNTER 2. MLDR1 and MLDR2 data is respectively transferred to the output of each said register at the positive transition of shared clock signal S.B.F., to become identified as signals: Mode Select A and Mode Select B.

Figure 4:
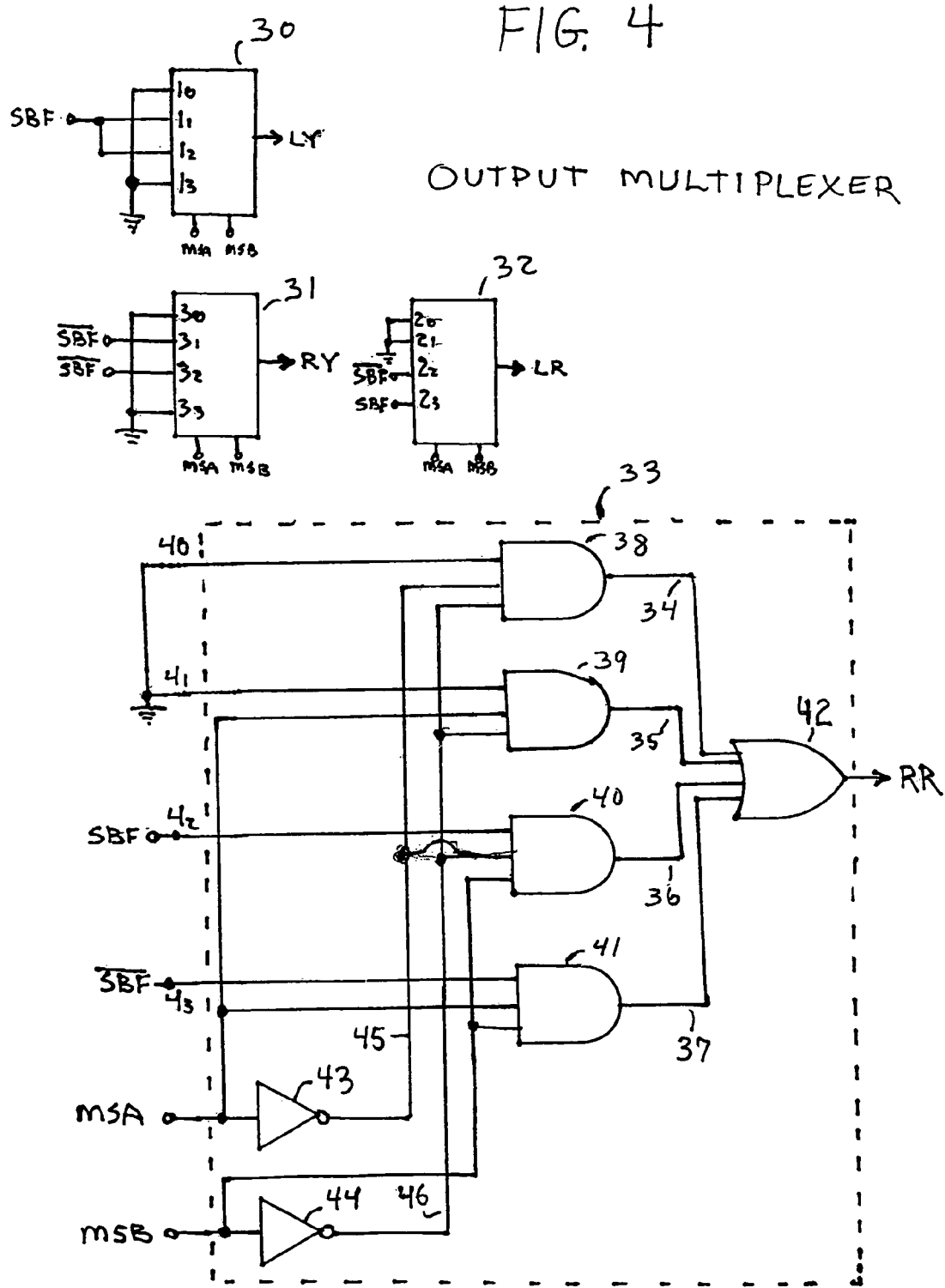
FIG. 4 is a diagram of the "Output Multiplexer" block shown in FIG. 1 in greater detail.

Turning now to FIG. 4, it shows the OUTPUT MULTIPLEXER 6 of FIG. 1 in greater detail. The OUTPUT MULTIPLEXER 6 is comprised of four identical circuits. In FIG. 4, three of these circuits are shown generally and a fourth is shown in greater detail. Each circuit comprises four AND gates, on OR gate, and two inverters. These components are connected to selectively rout one of four inputs to its output, as determined by inputs MSA and MSB. Only the Right RED traffic control output will be explained, as only the input connections to the Left Red, Left Yellow and Right Yellow Multiplexers differ. The Right Red Multiplexer is composed of four AND gates 38-41, each gate having three inputs. The outputs of gates 38-41 are connected as inputs to OR gate 42 and the output of said gate is multiplexer Right Red Output. Signals MSA and MSB and their complements, as inverted by 43-44 are connected to AND gates 38-41 to selectively enable one of said gates, in accordance with the previously described scheme. The left/right alternating effect of the invention is due to multiplexer input signals SBF and SBFX causing the output of the enabled multiplexer gate to switch high and low.

Figure 6:
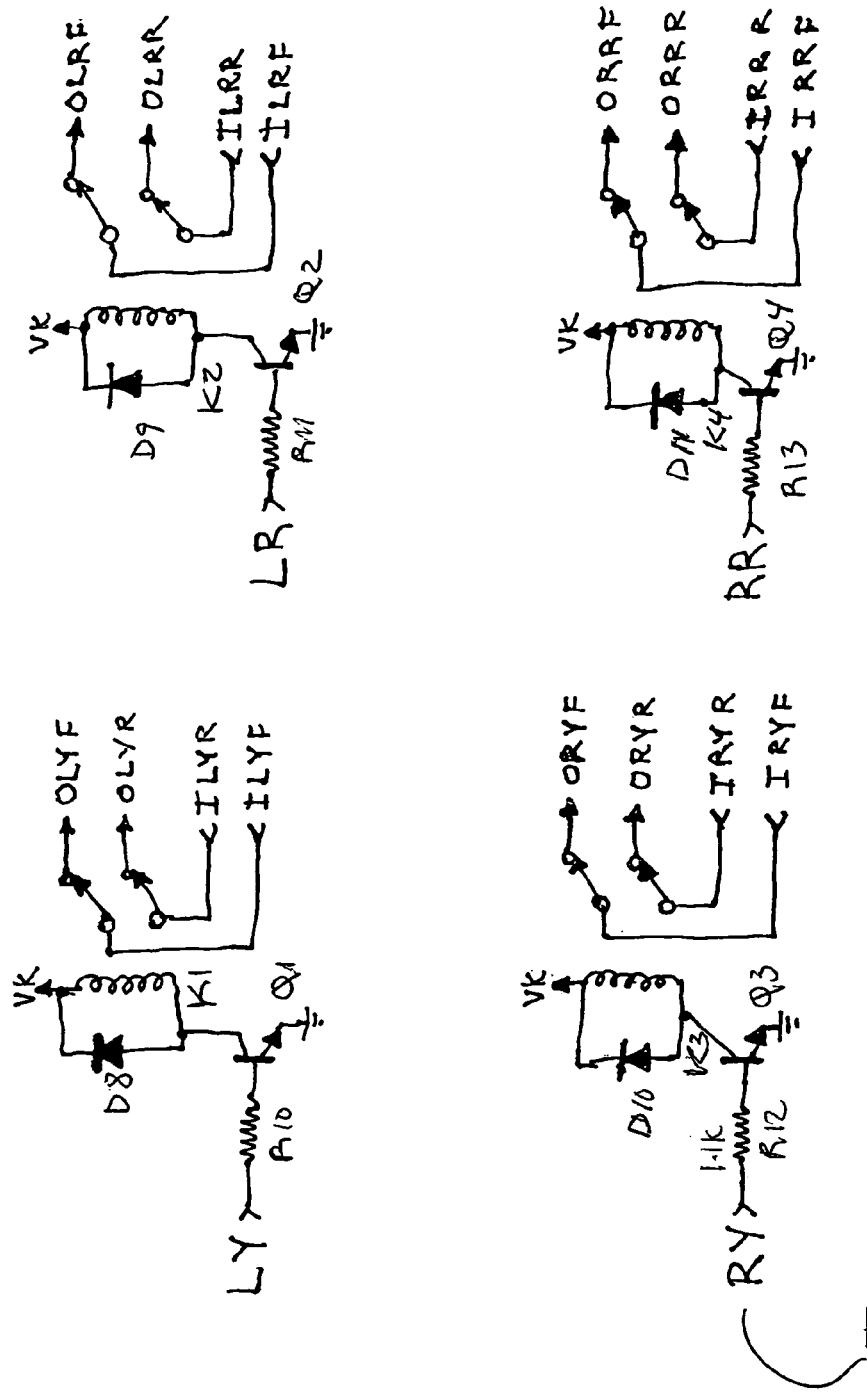
FIG. 6 is a diagram of a plan of the "Output Control" block shown in FIG. 1 in greater detail.

As shown in FIG. 1, the OUTPUT MULTIPLEXER 6 is, in turn, coupled to the OUTPUT CONTROL 9 circuit. Turning now to FIG. 6, it shows the OUTPUT CONTROL 9 circuit of FIG. 1 in greater detail. The OUTPUT CONTROL 9 circuit also comprises four identical circuits. Only the Right Red output will be detailed, as one of the ordinary skill in the art can easily determine the operation of the remainder of the FIG. 6 circuits as the operation is the same. Signal RR is applied to one end of R13, the remaining end is connected to the base of transistor Q4. The emitter of Q4 is grounded, and its collector connects to one end of relay coil K4 and the anode of diode D11. The cathode of D11 and the remaining end of K4 is tied to positive operating potential, VK. Relay K4 is of the double pole, single throw type. IRRF and IRRR is the energizing force to the Right Red, Front and Rear traffic control lights, and is applied respectively to each pole of K4. Signals ORRF and ORRR connect respectively from the throws of K4 to cause to illuminate when energized its corresponding Right Red Front and Rear traffic control light activator or light. When signal RR is a logical one, Q4 is conductive, energizing K4, therefore connecting signals: IRRF to ORRF and IRRR to ORRR to illuminate traffic control lights Right Red both front and rear. The other outputs "LY," Left Yellow, "LR," Left Red and "RY" Right Yellow operate in the same manner.

Figure 8:
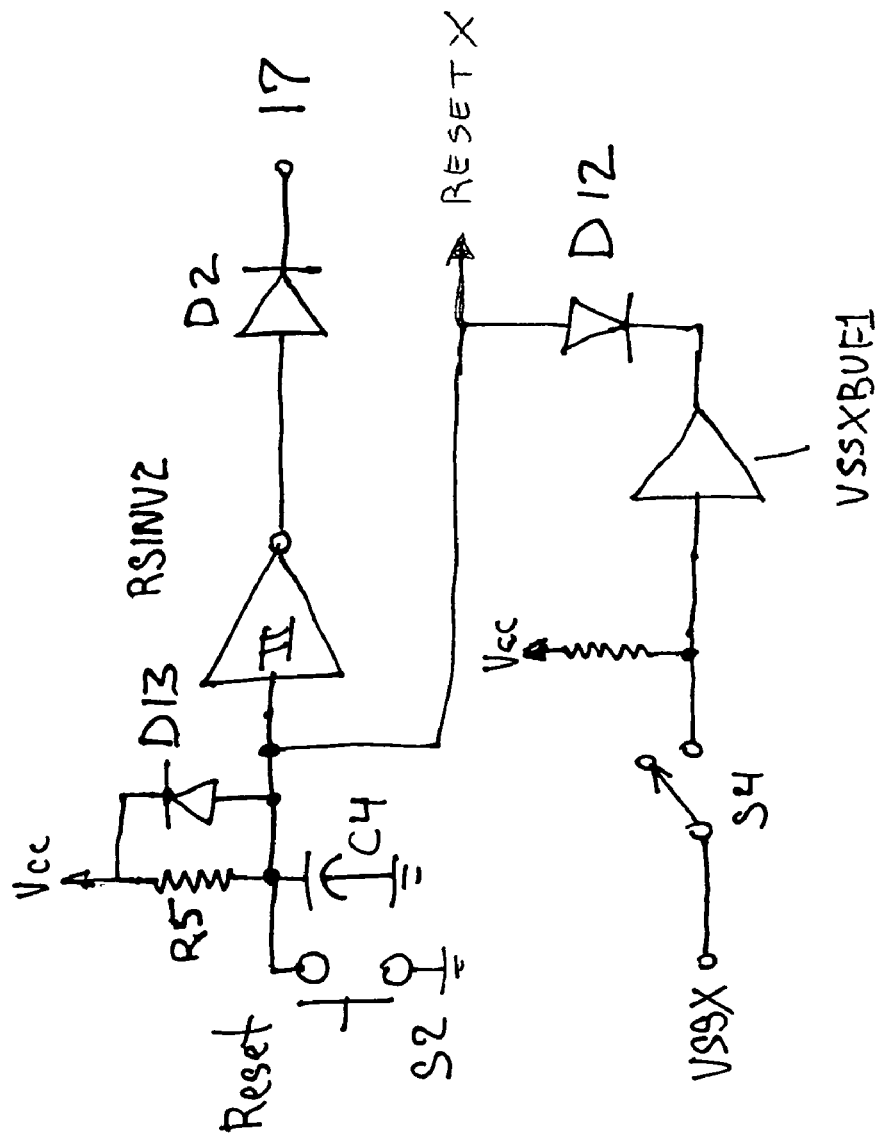
FIG. 8 is a diagram of a plan of the "Reset" circuitry block shown in FIG. 1 in greater detail.

Turning now to FIG. 8, it shows the RESET 8 circuit of FIG. 1 in greater detail. As show in FIG. 8, the first electrode of Reset switch S2 is grounded, the remaining electrode, identified as RESET is connected to one end of C4 and R5 the input of inverter RINV, and the anode of diode D13. The remaining terminal of R5 connects to Vcc and C4 to ground and the cathode of D12 to the output of buffer VSSXBUF1. VEHICLE SPEED SENSE NOT (VSSX) is an output from external equipment, and is a logic low when the school bus is in motion. That signal is applied to the pole of input control switch S4. As shown in FIG. 8, the throw of switch S4 connects to the remaining end of pullup resistor R14 and the input of buffer VSSXBUF. When power is first applied, C4 charging through R5 will produce a low to reset the apparatus. Also, when S2 is pushed or, if S4 is closed, the apparatus will be reset if VSSX is active.

Those with skill in the art will recognize that, while the preceding specification has described particular embodiments of the present inventions with respect to specific details, various modifications to these embodiments could be made without departing from the scope of the invention. For example, in the preferred embodiment, integrated circuitry of low and medium complexity is utilized. However, substitutions, such as discrete, microprocessor, P.L.A. and mechanical devices and changes in the form and detail can be effected by those skilled in the art without department in any way from the spirit of the invention. Thus, the scope of the invention should be understood with reference to the following claims and their equivalents.

What is claimed:

1. An electronic apparatus for the regulation of traffic control lights of a school bus comprising:
   a. logic circuitry, said logic circuitry coupled to a plurality of lights mounted on a school bus and to a command effectuation mechanism, said command effectuation mechanism capable of receiving commands from an operator, said plurality of lights including a plurality of yellow lights and a plurality of red lights; and
   b. a power source, said power source operatively coupled to said logic circuitry and providing power to said logic circuitry;
   wherein, in the absence of any command initiated by the operator, the logic circuitry causes the plurality of lights to enter into a first mode of operation, and in response to a first command initiated by the operator using the command effectuation mechanism, the logic circuitry causes the plurality of lights to enter into a second mode of operation, the second mode of operation differing from the first mode of operation, and in response to a second operator command following the first command, the logic circuitry causes the plurality of lights to enter into a third mode of operation, the third mode of operation differing from the first and second modes of operation, and in response to an automatic signal following the second command, the logic circuitry causes the plurality of lights to enter into a fourth mode of operation, the fourth mode of operation differing from the first, second and third modes of operation.

2. The electronic apparatus of claim 1 wherein in the first mode of operation, both the plurality of yellow lights and the plurality of red lights remain inactive.

3. The electronic apparatus of claim 2 wherein in the second mode of operation, the plurality of yellow lights are sequentially activated and inactivated while the plurality of red lights remain inactive.

4. The electronic apparatus of claim 3 wherein in the third mode of operation, the plurality of yellow lights are sequentially activated and inactivated and the plurality of red lights are also sequentially activated and inactivated.

5. The electronic apparatus of claim 4 wherein in the fourth mode of operation, the plurality red lights are sequentially activated and inactivated while the plurality of yellow lights remain inactive.

6. The electronic apparatus of claim 5 wherein the third mode of operation has a duration of approximately three seconds.

* * * * *